UNITED STATES PATENT OFFICE.

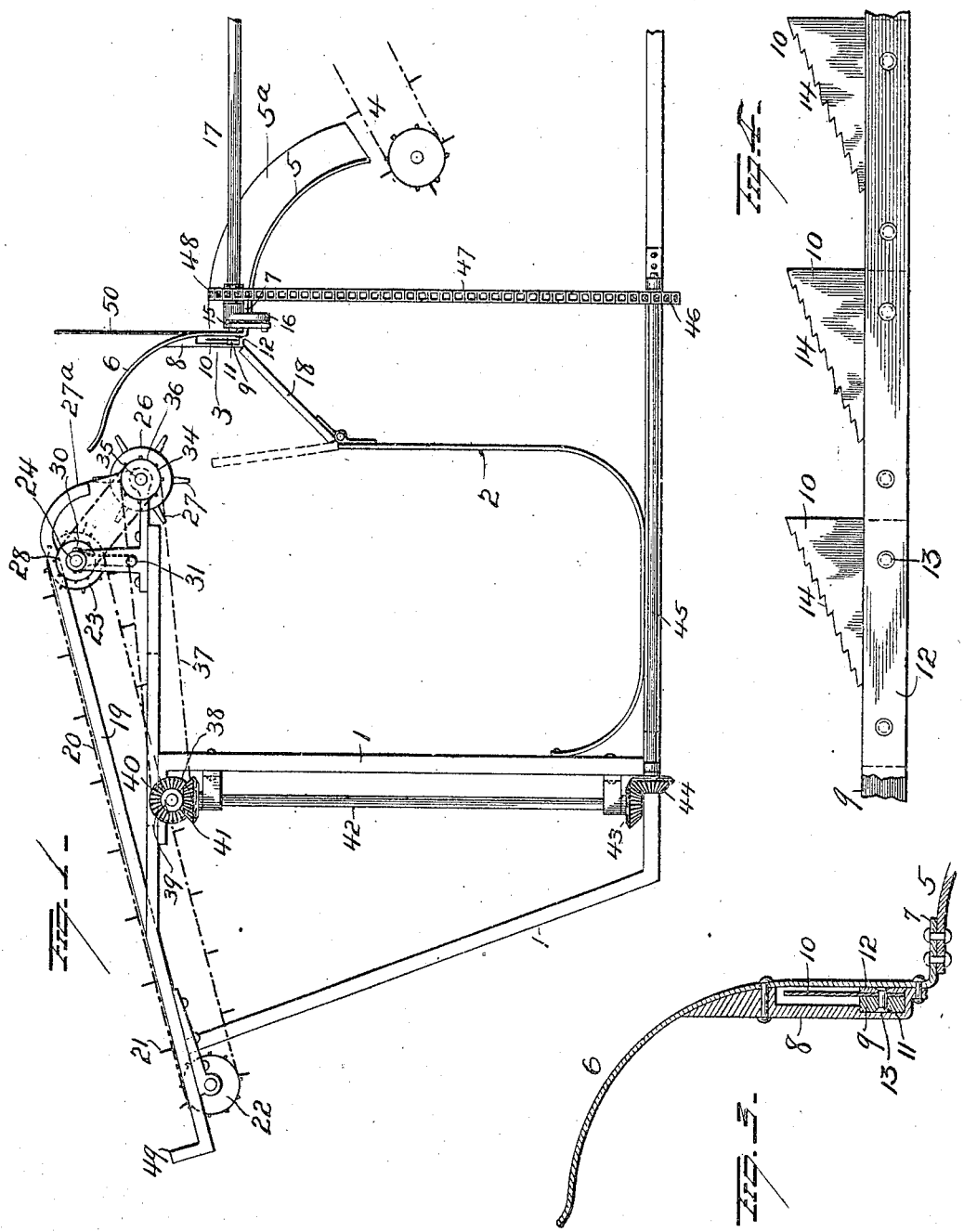

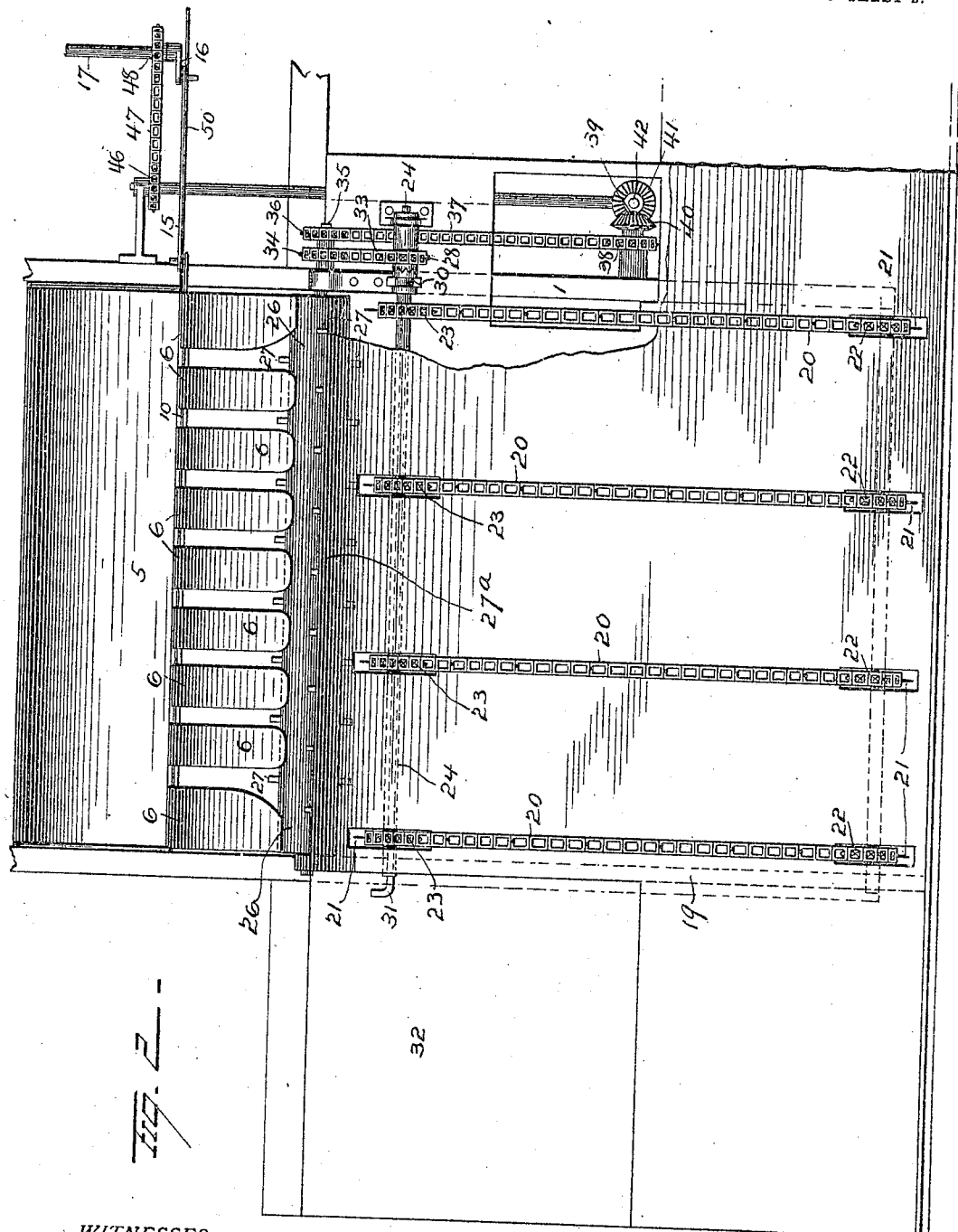

FRANCIS M. WIDERMAN, OF WOODLAWN, BALTIMORE, MARYLAND.

MACHINE FOR CUTTING EARS OF CORN FROM THE STALKS.

948,601.  Specification of Letters Patent.  Patented Feb. 8, 1910.

Application filed May 15, 1909. Serial No. 496,160.

*To all whom it may concern:*

Be it known that I, FRANCIS M. WIDERMAN, of Woodlawn P. O., Baltimore, in the county of Baltimore and State of Maryland, have invented certain new and useful Improvements in Machines for Cutting Ears of Corn from the Stalks; and I do hereby declare the following to be a full, clear, and exact description of the invention, such as will enable others skilled in the art to which it appertains to make and use the same.

This invention relates to improvements in machines for cutting ears of corn from the stalks,—one object of the invention being to so construct a machine for the purpose stated, that the stalks of corn can be fed horizontally to means for severing the ears therefrom, and so that the stalks (minus the ears of corn) can be discharged horizontally to suitable means adapted for their reception and the ears of corn delivered to a suitable conveyer by means of which they may be carried to a husker or otherwise discharged.

A further object is to provide simple and efficient cutting means for severing the ears of corn from the stalks and for insuring the proper discharge of the stalks and ears to separated receiving means.

With these and other objects in view the invention consists in certain novel features of construction and combinations of parts as hereinafter set forth and pointed out in the claims.

In the accompanying drawings, Figure 1 is a view in elevation of a machine embodying my improvements. Fig. 2 is a plan view. Fig. 3 is an enlarged sectional view showing the cutting mechanism for severing the ears of corn from the stalks, and Fig. 4 is a detailed view of the cutter.

1 represents suitable framework, in which a receptacle 2 is located for stalks from which the ears of corn have been removed by means of cutting mechanism located at 3, Fig. 1. Also located in said framework is a conveyer 4 adapted to receive ears of corn which have been severed from the stalks by the cutting mechanism, said ears being directed to the conveyer 4 by means of a curved apron 5 secured in the framework and provided at its respective ends with flanges 5ᵃ.

A horizontal series of curved fingers 6 is located at the upper edge of the apron 5 and suitably spaced apart. Each finger 6 is made comparatively broad and provided at its lower end with a flange 7 to facilitate its attachment to the apron 5, and at the free end, the corners of each finger 6 is somewhat rounded as most clearly shown in Fig. 2. The several fingers of the series have secured to their rear faces recessed blocks 8 for the accommodation of a cutter bar 9 and knives 10 carried thereby. The cutter-bar 9 is adapted to reciprocate in recesses 11 in the blocks 8 and the knives 10 are secured to the cutter-bar 9 by means of a strip or plate 12 and rivets 13. Each knife or blade 10 projects upwardly from the edge of the cutter-bar and is provided with an inclined cutting edge preferably having saw teeth 14.

One end of the cutter-bar 9 has attached thereto, a pitman 15, the opposite end of which is connected with a crank-arm 16 on one end of a driving shaft 17. By this means the cutter-bar will be reciprocated so that its knives, in passing the slots or openings formed between the fingers 6, will sever the ears of corn from the stalks and permit said ears to pass over the curved apron 5 and be directed by the latter to the conveyer 4 by which they will be carried to a husker not shown or to other place of discharge. The stalks of corn will be so fed in a horizontal position to the fingers 6 that the ears of corn will be caused to pass over said fingers and the stalks under the latter until the cutter shall have been reached, when the ears will be severed as above described and the stalks permitted to drop horizontally into the receptacle 2. One wall of this receptacle may be provided with a door 18 which can be shifted from the position shown in Fig. 1 so that the stalks may be discharged to one side of the receptacle 2 and be received by a conveyer or cutting mechanism not shown. For feeding the stalks of corn to the fingers and cutting mechanism, the devices now to be described will be employed.

The framework 1 supports an inclined platform 19 over which a series of conveyers 20 pass,—said conveyers being of the endless chain type provided with fingers 21 and adapted to pass over sprocket wheels 22 located near the receiving end of the platform and over sprocket wheels 23 secured to a shaft 24 near the discharge end of said platform. In advance of the discharge end of the platform and the conveyers thereon, a feed drum 26 having fingers 27 is located.

The stalks of corn are guided from the discharge end of the platform 19 to the feed drums 26 by means of a curved hood 27ª, secured at the forward end of the inclined platform 19. The upper conveyer shaft 24 is extended laterally beyond one of its bearings and has mounted thereon a sprocket wheel 28 adapted to be connected with the shaft 24 through the medium of a clutch 30 so that the operation of the conveyers 20 can be under the complete control of the operator,—a suitable rod or lever 31 being provided for controlling said clutch and said rod having a handle located within convenient reach of an operator standing near the platform 32. Motion is transmitted to the sprocket wheel 28 by means of a chain 33 which receives motion from a sprocket 34 on the extended journal 35 of the feed drum 26. The extended journal 35 is also provided with a sprocket wheel 36 over which a chain 37 passes and this chain receives motion from a sprocket 38 on a short shaft 39 mounted in the framework. The short shaft 39 is provided at one end with a beveled gear 40 which receives motion from a beveled gear 41 secured to the upper end of a vertical shaft 42 and the latter is provided at its lower end with a beveled gear 43 which receives motion from a similar gear 44 carried by a horizontal shaft 45 in the lower portion of the framework. The shaft 45 is provided with a sprocket wheel 46 to which motion is imparted, through the medium of a chain 47 from a sprocket wheel 48 on the driving shaft 17. The operator will stand near the platform 32 and the attendants will place the stalks of corn horizontally upon the inclined platform 19 and, should the conveyers 20 be at rest, the stalks will be prevented from falling off said inclined platform by means of an upwardly projecting flange 49 at the lower end of said inclined platform. Assuming the conveyers 20 to be in motion when the stalks of corn are placed upon the inclined platform, said stalks while being disposed in horizontal positions will be moved upwardly over the platform by the operation of said conveyers and delivered under the hood 27ª and to the feed drum below said hood. The rotation of the feed drum will cause the fingers 27 thereon to press the stalk forwardly under the fingers 6 and permit the ears of corn to pass over said fingers 6 until the cutter is reached when the ears will be severed as before explained.

A guard plate 50 may project laterally from the framework in line with the intersection of apron 5 and fingers 6 and serve to protect the gearing adjacent to the cutting mechanism and to properly deflect the stalks.

Having fully described my invention what I claim as new and desire to secure by Letters-Patent, is,—

1. In a machine of the character described, the combination with cutting means, and a series of curved fingers spaced apart adjacent to said cutting means, of means for feeding stalks of corn horizontally to said fingers whereby the stalks will be caused to pass under said fingers and the ears over the same to the cutting means.

2. In a machine of the character described, the combination with a series of curved fingers spaced apart, a cutter carried by said fingers, and means for operating said cutter, of means for feeding stalks of corn to said fingers and causing said stalks to pass under the fingers and the ears over the latter to the cutter.

3. In a machine of the character described, the combination with a series of curved fingers spaced apart, and a cutter carried by said fingers, of means for feeding stalks of corn to said fingers and cutter, receiving means for the stalks, receiving means for the ears of corn, and means for directing the ears of corn from the cutter to said last mentioned receiving means.

4. In a machine of the character described, the combination with framework, of an inclined discharge apron secured thereto, a series of curved fingers secured to said discharge apron and spaced apart, cutting means located in proximity to the juncture of said discharge apron and fingers, and means for feeding stalks of corn to said fingers and cutting means, whereby the ears of corn are severed from the stalks and discharged over said discharge apron.

5. In a machine of the character described, the combination with a series of curved fingers spaced apart, a reciprocating cutter bar, located in proximity to the base portions of said fingers, a series of knives having inclined cutting edges, secured to said cutter bar, means for feeding stalks of corn to said fingers and knives for severing the ears of corn from the stalks, and means for reciprocating said cutter bar.

6. In a machine of the character described, the combination with a series of curved fingers spaced apart, of a cutter bar located adjacent to the base portions of said fingers, a series of knives secured to said cutter bar and projecting upwardly therefrom, each knife having an inclined cutting edge provided with teeth, means for reciprocating said cutter bar and the knives carried thereby, and means for feeding stalks of corn horizontally to the fingers and to the knives of the cutter bar for severing the ears of corn from the stalks.

7. In a machine of the character described, the combination with framework and horizontally disposed cutting means, of a platform, conveyers mounted to travel over said platform, a feed drum disposed below the discharge end of the platform, and means for directing stalks of corn having ears thereon from the feed drum to the cutting means for severing the ears from the stalk.

8. In a machine of the character described, the combination with framework, a horizontally disposed cutting means, and a series of curved fingers spaced apart and coöperating with said cutting means, of an inclined platform, conveyers mounted to travel over said platform, a feed drum disposed below the discharge end of the platform and feed stalks of corn to said curved fingers, and means for directing the stalks of corn from the discharge end of the platform to the feed drum.

In testimony whereof, I have signed this specification in the presence of two subscribing witnesses.

FRANCIS M. WIDERMAN.

Witnesses:
    LOUIS J. BURLEIGH,
    FRANK B. DAVIS.